United States Patent [19] — Mogi et al.

[11] Patent Number: 4,805,085
[45] Date of Patent: Feb. 14, 1989

[54] DIGITAL CONTROL SYSTEM FOR ELECTRONIC APPARATUS

[75] Inventors: Takao Mogi; Masayuki Suematsu, both of Tokyo, Japan

[73] Assignee: Sony Corporation, Tokyo, Japan

[21] Appl. No.: 203,616

[22] Filed: Jun. 6, 1988

[30] Foreign Application Priority Data

Apr. 6, 1985 [JP] Japan .................. 60-073217

[51] Int. Cl.$^4$ .............. G06F 15/46; G06F 11/16; G06F 15/16
[52] U.S. Cl. .................. 364/132; 364/200; 371/9; 371/11
[58] Field of Search ............. 364/131–134, 364/187, 200 MS File, 900 MS File; 371/8, 9, 11

[56] References Cited

U.S. PATENT DOCUMENTS

| | | | |
|---|---|---|---|
| 3,377,623 | 4/1968 | Reut et al. | 364/200 |
| 3,636,331 | 1/1972 | Amrehn | 371/9 X |
| 4,133,027 | 1/1979 | Hogan | 364/187 |
| 4,352,103 | 9/1982 | Slater | 371/8 X |
| 4,412,281 | 10/1983 | Works | 371/9 X |
| 4,449,202 | 5/1984 | Knapp et al. | 364/900 |
| 4,527,071 | 7/1985 | Ausiello | 364/132 X |
| 4,583,089 | 4/1986 | Cope | 371/8 X |
| 4,610,013 | 9/1986 | Long et al. | 371/9 |
| 4,634,110 | 1/1987 | Julich et al. | 371/11 |

FOREIGN PATENT DOCUMENTS 0051332 5/1982 European Pat. Off. .
2118740 4/1983 United Kingdom .

OTHER PUBLICATIONS

IEEE Publication, Fastbus Modular High Speed Data Acquisition System, pp. 5C.4.1–5C.4.5.; date unknown.

Primary Examiner—Joseph Ruggiero
Attorney, Agent, or Firm—Lewis H. Eslinger; Jay H. Maioli

[57] ABSTRACT

A digital control system for electronic apparatus employs an internal bus system and includes at least one master controller and a plurality of operational circuits connected via control bus lines so that, during normal operation of the electronic apparatus, the master controller can carry out predetermined control operations relative to the respective circuit blocks. During testing and/or adjustment, an auxiliary master control circuit is connected to the control bus lines in order to control the operational circuitry in place of the master control circuit, while holding the master control in the slave mode.

4 Claims, 2 Drawing Sheets

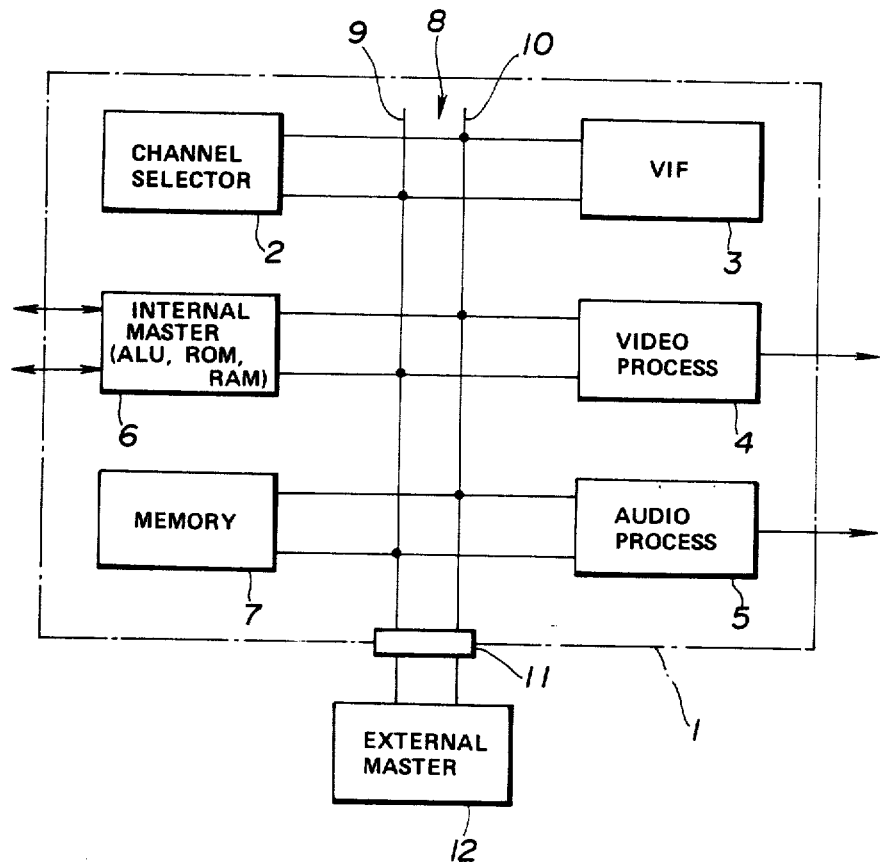
FIG. 1
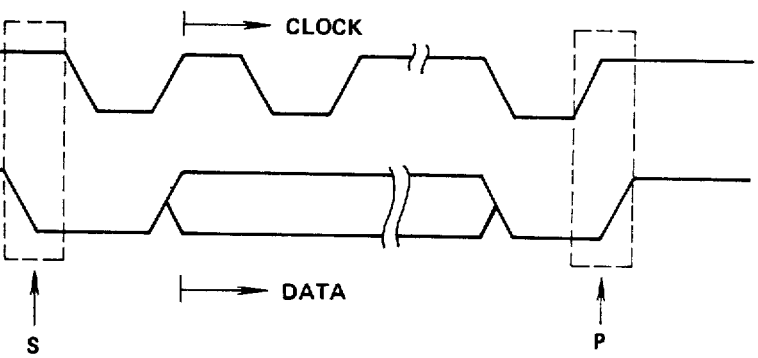
FIG. 2 (A)
FIG. 2 (B)

DIGITAL CONTROL SYSTEM FOR ELECTRONIC APPARATUS

This is a continuation of application Ser. No. 846,191 filed 3-31-86.

BACKGROUND OF THE INVENTION

1. Field of the Invention

This invention relates generally to digital control systems for electronic apparatus and, more particularly, to digital control of internal circuitry of television receivers and video tape recorders by digital data.

2. Description of the Background

There are now well known various kinds of video and audio equipment, such as television receivers, video tape recorders, and audio tape recorders in which there are digitally controllable internal circuits. Many of the examples of such digitally controllable electronic apparatus have adopted internal bus systems. Typically, an internal bus system includes a central processing unit (CPU), an internal bus, and a read only memory (ROM), which are located within the electronic apparatus. The read only memory may be considered as part of the central processing unit and is used to store the operational information for each of the various internal circuits. In normal operation of such known electronic apparatus, the central processing unit reads the operational information out of the read only memory and transmits such information to the corresponding operational circuit over the internal bus lines, so that the corresponding internal circuit properly performs its predetermined operation. Typically, further means of control is provided for each of the internal operational circuits by providing a keyboard or remote controller that can communicate over the internal bus lines with the various internal operational circuits. Both a two-wire bus and a three-wire bus have been advantageously used in such internal bus systems. This kind of internal bus line system is disclosed in Japanese Patent Application No. 57/106262, and it is known that in the three-wire type system the bus lines comprise a data transmission line, a clocksignal transmission line, and an identification signal transmission line, in which the identification signal is used to specify a data block. In the two-wire bus, only a clock signal line and a data signal line are typically provided.

By using an internal bus system, it is possible to substantially simplify the internal wiring that is required to interconnect the various operational circuits in the electronic apparatus and, moreover, testing, manufacturing, and servicing of the electronic apparatus can be carried out using a software approach that further reduces the costs involved. Thus, in utilizing an internal bus system, it is possible that testing, adjustments, and manufacturing can be standardized universally and are so facilitated that overall economic reductions, including lowered manufacturing costs, can be achieved. Accordingly, multi-purpose, high-performance electronic apparatus can easily be fabricated by interconnecting numerous internal operational circuits with an internal bus.

This type of internal bus system is highly suited for use in systems having a plurality of central processing units and a plurality of internal operational circuits controlled by such central processing units, in which the central processingunits are typically referred to as masters and the internal circuits as slaves. Generally, at least one master is incorporated into the specific digitally controllable electronic apparatus and an external master is provided to be connected to the internal bus of the electronic apparatus through an external terminal. Typically, such external master is a so-called microcomputer.

Because the masters and slaves all use the internal bus lines, data communication among the various masters and slaves can be carried out in units of blocks, which define the bus utilization interval, and with such blocks being delimited by start information, such as a specific signal pattern that indicates occupation of the bus, and subsequent stop information. In that case, one master issues the start information to declare that master a controller, sends the address information of one slave to select the control object, transmits the control data or receives data to or from the slave to perform the predetermined control or monitor or check the operation, and then finally transmits the stop information to declare that the master is no longer the controller. In one format accomplishing such operation the rising edge of the stop information pulse indicates that the occupation of the internal bus by that master has ended and that the bus has been released.

Generally, time margins are provided between each block of data transmission, so that any one of the masters can become the controller by interrupting during a time margin. Nevertheless, in cases where an automatic adjustment loop is formed with the slaves, or an external master including an adjustment computer is connected to the adjustment loop, or when an open-loop adjustment is carried out by means of software, an internal master will often interrupt to start its own control when the bus is released midway through the series of data transmissions. In such situation, the external master then loses control and passes to a stand-by state and the adjustment operation does not proceed as desired. In a worst case situation, intermediate data might be destroyed so that the adjustment cannot be completed.

OBJECTS AND SUMMARY OF THE INVENTION

Accordingly, it is an object of the present invention to provide a digital control system for electronic apparatus that can eliminate the above-noted defects inherent in the prior art.

Another object of this invention is to provide a digital control system for electronic apparatus in which other master controllers are prevented from performing unnecessary operations, even when the data bus is released in cases where one master continues to be the controller.

In accordance with an aspect of the present invention, a digital control system for electronic apparatus includes a master controller and a plurality of internal circuits of the electronic apparatus to be controlled by the master controller, a control bus line interconnects the master controller and the plurality of controllable circuits, and an auxiliary master control means is connected to the control bus lines for controlling the internal circuitry in place of the master control, while holding the master control means in a slave mode.

The above and other objects, features, and advantages of the present invention will become apparent from the following detailed description of illustrative embodiments thereof to be read in conjunction with the accompanying drawings, in which like reference numerals represent the same or similar elements.

BRIEF DESCRIPTION OF THE DRAWINGS

FIG. 1 is a schematic in block diagram form of a digital control system according to an embodiment of the present invention, which is applicable to a television receiver;

FIGS. 2A and 2B are waveform diagrams showing signals of the respective clock line and data transmission line found in the circuit of FIG. 1;

DETAILED DESCRIPTION OF PREFERRED EMBODIMENTS

Figure 3:
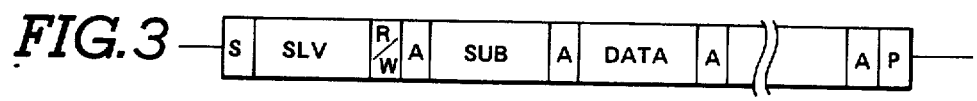
FIG. 3 is a representation of a data format for transferring data over the data transmission bus line of FIG. 1.

FIG. 1 represents in block diagram form the essential portions of a television receiver that relate to an embodiment of the present invention. More particularly, a television receiver 1 enclosed within the dot-dash line includes a channel selector 2, a video intermediate frequency (VIF) circuit 3, a video signal processing circuit 4, and an audio signal processing circuit 5. These units may be thought of as comprising slaves, which may be constituted by several solid-state integrated circuits, and are each connected to an internal master 6 and a memory 7 by way of a two-wire internal bus 8. The two-wire internal bus 8 comprises a data transmission line 9 and a clock transmission line 10.

The internal master 6 typically comprises a central processing unit forming a microcomputer and includes an arithmetic logic unit, registers, read only memory, and a random access memory. Advantageously, memory 7 comprises an eraseable, programmable, nonvolatile read only memory, generally referred to as an EPROM, and serves to store control and/or circuit adjustment data. Internal bus 8 formed of data transmission line 9 and clock transmission line 10, is connected to an external terminal 11 that may comprise a standard jack to which is connected an external master unit 12, which may be thought of as an adjustment computer and which generally includes its own central processing unit.

In normal operation of a television receiver, such as shown in FIG. 1, internal master 6 monitors a keyboard or remote controller and controls the display in accordance with a series of instruction sequences programmed into read only memory 7. In addition, internal master 6 fetches preset channel data from memory 7, receives data on an intermediate frequency carrier level from VIF circuit 3 during channel selection, performs a predetermined arithmetic operation on the basis of the received data and sends data to the channel selector 2. In addition, internal master 6 performs monitoring and controlling of the video processing circuit 4 and audio processing circuit 5 over the relatively long interval of time that the television receiver is operating.

FIGS. 2A and 2B are examples of waveform diagrams showing the timing present during data transfer between the master and slaves, which is required for the series of control sequences such as described above. More particularly, FIG. 2A represents the waveform of the clock signal present on line 10 in FIG. 1, and FIG. 2B represents a waveform of the data signal present on data transmission line 9 of FIG. 1. As seen in FIGS. 2A and 2B when both data line and clock signal line are at high levels, the internal bus is in a so-called released state. In that state, internal master 6 holds clock signal transmission line 10 at the same level and changes the serial data transmission line 9 to a low level, thereby declaring that master 6 is now the controller. This particular signal level pattern on lines 9 and 10 is considered the Start condition, that is, the start pattern and is represented by the dashed lines S in FIGS. 2A and 2B.

Accordingly, upon starting, internal master 6 transmits data over data line 9, represented in FIG. 2B in synchronization, with clock pulses as represented in FIG. 2A on clock transmission line 10. At the conclusion of the data transfer, both clock signal transmission line 10 and data transmission line 9 return to a low level and thereafter, once clock signal transmission line 10 rises to a high level and data transmission line 9 also rises to a high level, this indicates that the internal bus is again released and this signal pattern is defined as the stop condition or stop pattern shown in dashed lines P at FIGS. 2A and 2B.

FIG. 3 is a representation of a format for transferred data on data transmission line 9 and the segments of this data format will be seen from the following. When master 6 sends a slave address (SLV) following the existence of the start condition (S), as shown in FIGS. 2A and 2B, this specifies the particular one of the plurality of slaves with which data transmission will be initiated. The data then proceeds with master 6 providing the read/write (R/W) bit that indicates whether transmlssion or reception is desired, that is, whether read or write is desired, in cases where a mmmory is selected as a slave, and then the data includes a subaddress (SUB) transmitted following an acknowledge bit (A), which specifies the function or item of the controlled object in the slave. For example, when video processing circuit 4 is the slave, brightness, contrast, or color phase can be specified by the sub-address SUB.

Next in the data format master 6 sends control data DATA after an acknowledged bit A to perform a predetermined control or adjustment and then ultimately releases the bus by transmitting the stop condition as represented at P in FIGS. 2A and 2B.

when it is desired to provide adjustment during manufacture of the television receiver or during repair or maintenance following manufacture, the adjustment computer serving as an external master 12 can be connected to the plug-in terminal 11, so that data may be transferred to each slave to perform control, adjustment, and trouble shooting by way of internal bus 8.

Figure 4:
FIG. 4 is a representation of a data format used in a situation where an internal master is converted to a slave.

Becatuse operational difficulties would arise if internal master 6 were permitted to start its own control sequence during external control, an address SLV allocated to the internal master 6 by means of external master 12 is specified. As seen in FIG. 4, which represents a format of the data as provided by the external master 12, external master 12 specifies a specific register within internal master 6 by means of address REG and then transmits predetermined data D1 that may comprise, for example, "0000 0000" that indicates no operation, thereby inhibiting internal master 6 from functioning as the master. Upon receipt of the no operation instruction, "0000 0000", internal master 6 stops functioning as a master and is arranged to operate in the slave mode in which no control data can be issued. It should be noted that in the slave mode, data can be received by internal master 6 on internal bus 8 following the specification of the address of that internal master 6.

In this state then, the adjustment operation can be continued by use of external master 12 without interruption by internal master 6 and, upon completion of the various operations of external master 12, external master 12 transmits data (D2) that may comprise for example, "1111 1111" that corresponds to a release instruction, thereby releasing internal master 6 from its slave mode. Accordingly, once the internal master 6 receives the data D2, the internal master 6 is returned to its master mode in accordance with its predetermined program.

Figure 5:
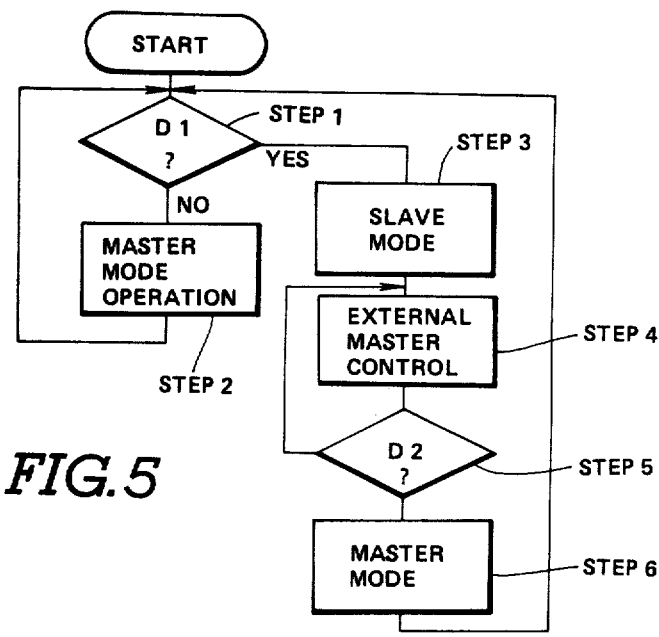
FIG. 5 is an operational flow chart of a method according to the present invention for switching an internal central processing unit between master and slave modes by means of an external master.
Figure 6:
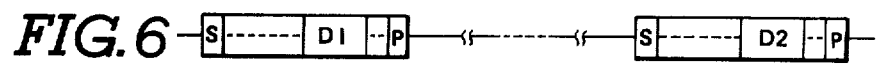
FIG. 6 is a representation of the data stream on the data line of the bus.

The above operations provided by the present invention are additionally described in relation to the flow chart of FIG. 5, in which following a start condition in step 1 it is checked to determine whether the data D1 has been received, which means that it is determined whether there is an external request to change internal master 6 from a master mode to a slave mode. If data D1 has not been received, then internal master 6 performs its normal functions in step 2 and the procedure returns to step 1. On the other hand, if data D1 has been received in step 1, internal master 6 is changed into the slave mode in step 3 and in step 4 internal master 6 operates in the slave mode, that is, it monitors the internal bus for further input. Subsequently, in step 5 internal master 6 determines whether data D2 has been received, that is, it checks to see whether there is a request for the internal master 6 to return to its master mode. If such data D2 has been received, the procedure goes to step 6 in which internal master 6 is changed to its master mode from the slave mode. Consequently, control by means of external master 12 has been completed and control is thereby returned to step 1. On the other hand, if data D2 has not been received in step 5, the procedure returns to step 4 to permit the external master 12 to continue its control of the internal bus. There will, of course, be some time margin M between the issuance of the data D1 and issuance of the data D2, in which time margin external master 12 is free to occupy internal bus 8 and, thus, can execute its adjustment operations in a smooth and uninterrupted fashion.

Alternatively, a method similar to FIG. 5 can be provided so that internal master 6 is returned to a master mode at a set or fixed time interval after the point in time in which it enters the slave mode. Similarly, internal master 6 may be changed to the slave mode upon receiving a specific control data D1 and then be returned back to the master mode upon receiving the same control data a second time, while it is in the slave mode.

It should be noted that a parallel data bus may be utilized in place of the serial data bus described above, and also an independent address bus could be included. Additionally, a pair of unidirectional buses could be used in place of the bi-directional bus shown herein, and other bit patterns are possible for use in place of the patterns shown in FIG. 2 to comprise the start pattern and stop pattern in the data transfer format.

Thus, described hereinabove is a digital control system according to the present invention that can have predetermined control and adjustment operations performed without disturbance from other masters by permitting a single master to hold the other masters in a slave mode, in situations where a plurality of central processing units are each capable of controlling a slave via an internal bus system. Accordingly, an external adjustment computer, for example, connected to the internal bus lines can freely control or adjust slave central processing units and other circuits within an electronic apparatus.

Although illustrative embodiments of the invention have been described in detail herein with reference to the accompanying drawings, it is to be understood that the invention is not limited to such precise embodiments and that various changes and modifications can be effected therein by one skilled in the art without departing from the spirit and scope of the invention, as defined in the appended claims.

What is claimed is:

1. A digital control system for use in electronic apparatus, comprising:
    master control means arranged within the electronic apparatus containing first operational dat and producing a data signal and a clock signal;
    a plurality of operational circuit elements arranged within the electronic apparatus and connected to be controlled by said master control means;
    control bus lines comprising a data signal line and a clock signal line interconnecting said master control means and said plurality of operational cirucit elements, said control bus lines being in a release state upon occurence of a predetermined relationship between said clock signal and data signal;
    said master control means including means for declaring itself master master of said electronic apparatus upon occurence of said predetermined relationship and an inhibit register for inhibiting said master control means from declaring itself the master and placing said master control means in a slave mode upon receipt of a predetermined data word; and
    auxiliary master control means arranged external to the electronic apparatus and adapted to be connected to said control bus lines and transmitting second operational data by way of said control bus lines for alternatively controlling said operational circuit elements in place of said master control means and in which said second operational data in said auxiliary master control measn includes said predetermined data word for placing said master control means in said slave mode by transmitting said selected data word to said inhibit register in said master control means by way of said control bus lines, and in which said master control means includes means for returning to a master mode a predetermined time after being placed into the slave mode.

2. A digital control system according to claim 1, further comprising a connector terminal connected to said control bus lines and adapted to be connected to said externally arranged auxiliary master control means, whereby said auxiliary master control means is temporarily connected to said control bus lines.

3. A digital control system according to claim 2, in which said auxiliary control means includes means for transmitting address data specifying the master control means to receive control data in advance of a change in operational mode of said master control means.

4. A digital control system according to claim 1, in which said auxiliary control means includes means for transmitting address data specifying the master control means to receive control data prior to changing an operational mode of said master control means.

* * * * *

UNITED STATES PATENT AND TRADEMARK OFFICE
CERTIFICATE OF CORRECTION

PATENT NO. : 4,805,085
DATED : February 14, 1989
INVENTOR(S) : TAKAO MOGI et al.

It is certified that error appears in the above-identified patent and that said Letters Patent is hereby corrected as shown below:

Column 1, line 27, change "," to --.--;
           line 43, change "clocksignal" to --clock signal--;
           line 67, change "processingunits" to
           --processing units--.

Column 3, line 45, after "8" insert --,--.

Column 4, line 36, change "transmlssion" to --transmission--.
           line 37, change "mmmory" to --memory--;
           line 49, change "when" to --When--;
           line 56, change "Becatuse" to --Because--.

IN CLAIMS

Column 6, line 19, change "dat" to --data--;
           line 31, delete "master" second occurence;
           line 44, change "measn" to --means--.

Signed and Sealed this

Ninth Day of January, 1990

Attest:

JEFFREY M. SAMUELS

*Attesting Officer*     *Acting Commissioner of Patents and Trademarks*